(12) United States Patent
Kindler et al.

(10) Patent No.: US 6,440,594 B1
(45) Date of Patent: Aug. 27, 2002

(54) AEROSOL FEED DIRECT METHANOL FUEL CELL

(75) Inventors: Andrew Kindler, San Marino; Sekharipuram R. Narayanan, Altadena; Thomas I. Valdez, Covina, all of CA (US)

(73) Assignee: California Institute of Technology, Pasadena, CA (US)

( * ) Notice: Subject to any disclaimer, the term of this patent is extended or adjusted under 35 U.S.C. 154(b) by 58 days.

(21) Appl. No.: 09/595,078

(22) Filed: Jun. 16, 2000

Related U.S. Application Data (60) Provisional application No. 60/140,182, filed on Jun. 17, 1999.

(51) Int. Cl.[7] ............................................... H01M 8/04
(52) U.S. Cl. ............................................ 429/13; 429/30
(58) Field of Search ............................... 429/12, 13, 30

(56) References Cited

U.S. PATENT DOCUMENTS

| | | | |
|---|---|---|---|
| 3,581,462 A | | 6/1971 | Stump |
| 3,982,961 A | * | 9/1976 | Grasso .......................... 429/34 |
| 4,354,861 A | | 10/1982 | Kalt |
| 4,729,931 A | * | 3/1988 | Grimble ......................... 429/17 |
| 5,047,299 A | * | 9/1991 | Schockling ..................... 429/20 |
| 5,164,060 A | * | 11/1992 | Eisman et al. .................. 429/12 |
| 5,169,730 A | * | 12/1992 | Reichner et al. ................ 429/20 |
| 5,527,631 A | * | 6/1996 | Singh et al. .................... 429/20 |
| 5,561,000 A | | 10/1996 | Dirven et al. |
| 5,582,632 A | | 12/1996 | Nohr et al. |
| 5,593,721 A | | 1/1997 | Daidai et al. |
| 5,599,638 A | | 2/1997 | Surampudi et al. |
| 5,634,341 A | * | 6/1997 | Klanchar et al. ............... 60/673 |
| 5,773,162 A | | 6/1998 | Surampudi et al. |
| 5,795,496 A | | 8/1998 | Yen et al. |
| 5,851,689 A | * | 12/1998 | Chen ............................. 429/13 |
| 6,033,793 A | * | 3/2000 | Woods et al. .................. 429/17 |
| 6,045,772 A | * | 4/2000 | Szydlowski et al. ........... 423/652 |
| 6,136,463 A | | 10/2000 | Kindler et al. |
| 6,274,260 B1 | * | 8/2001 | Schuler ......................... 429/19 |

* cited by examiner

Primary Examiner—Patrick Ryan
Assistant Examiner—M. Wills
(74) Attorney, Agent, or Firm—Fish & Richardson P.C.

(57) ABSTRACT

Improvements to fuel cells include introduction of the fuel as an aerosol of liquid fuel droplets suspended in a gas. The particle size of the liquid fuel droplets may be controlled for optimal fuel cell performance by selection of different aerosol generators or by separating droplets based upon size using a particle size conditioner.

30 Claims, 6 Drawing Sheets

AEROSOL FEED DIRECT METHANOL FUEL CELL

CLAIM OF PRIORITY

This application claims priority under 35 USC§119(e) to U.S. Patent Application Serial No. 60/140,182, filed on Jun. 17, 1999, the entire contents of which are hereby incorporated by reference.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

TECHNICAL FIELD

This invention generally relates to fuel cells that rely upon electrochemical reactions to produce energy, more particularly to direct oxidation organic fuel cells which employ oxidation-reduction reactions at electrode surfaces to produce energy from an organic fuel provided in the form of an aerosol.

BACKGROUND

Fuel cells employing organic fuels are extremely attractive for use in both stationary and portable power applications, in part because of the high specific energy of the organic fuels. Moreover, fuel cells use an oxidation/reduction reaction instead of a combustion reaction, typically producing clean exhaust gases comprising mostly carbon dioxide and water as well as electrical energy.

Previously, some fuel cells used a "reformer" to convert the organic fuel to hydrogen gas in the fuel cells. Direct oxidation liquid feed fuel cells do not, however, require such fuel processing steps, and therefore offer a considerable weight and size advantage over indirect gas feed "reformer" fuel cells. In addition, the fuel concentration in a liquid feed is generally much greater than in a gas feed, improving mass transfer at the electrode and increasing cell performance.

Liquid feed fuel cells do have some negative features, including crossover of the fuel to the cathode, resulting in reduced fuel efficiency and decreased fuel cell performance. Crossover may be reduced by using a dilute solution of the organic fuel in an electrolyte such as water; however, this creates increased mass transfer resistance at the anode that may degrade cell performance. In addition, water may also cross over to the cathode in large quantities, which may cause cathode flooding, reducing cell performance and leading to excessive water loss.

The art continuously searches for methods to decrease the size and complexity of fuel cells, and to increase their fuel conversion efficiency, operating voltage, power output and operating performance. In particular, the art searches for methods to increase fuel efficiency and fuel cell operating performance by reducing fuel and water crossover without increasing mass transfer resistances at the fuel cell electrodes.

SUMMARY

The present invention provides a direct oxidation fuel cell in which the fuel is provided in the form of an aerosol of liquid fuel droplets suspended in a gas. The fuel cell comprises an anode, a cathode and an electrolyte. The aerosol is formed in an aerosol generator. The aerosol generator may use a variety of methods for producing the aerosol. Suitable methods include atomization of a liquid into a gas, or cooling a superheated mixture of fuel vaporized into a gas below the boiling point of the liquid to nucleate droplets of liquid fuel suspended in the gas. Suitable atomization methods include orifices, single fluid nozzles, two fluid nozzles, rotary atomizers, and ultrasonic atomizers.

In one embodiment, the aerosol is formed in an aerosol generator situated within the anode chamber of the fuel cell. In a preferred variation of this embodiment, the aerosol generator comprises a plurality of atomizers situated at the inner surface of a flow field element, fed with liquid fuel via a conduit, and acting to uniformly distribute liquid fuel droplets over the surface of the fuel cell anode. The atomizers may be selected from any number of fluid atomization devices, including orifices, single fluid nozzles, two fluid nozzles, rotary atomizers and ultrasonic atomizers.

In another embodiment, the aerosol is formed in an aerosol generator external to the anode chamber of the fuel cell and fed to the anode chamber via a duct. In one form of this embodiment, the aerosol is formed by heating the liquid fuel to a temperature above the boiling point of the liquid in the presence of a gas to form a superheated vapor, and subsequently cooling the superheated vapor to a temperature below the boiling point of the liquid fuel, thereby forming a suspension of liquid droplets in the gas. In another form of this embodiment, the aerosol is formed by atomization of the liquid into the suspending gas. The atomizers may be selected from any number of fluid atomization devices, including single fluid nozzles, two fluid nozzles, rotary nozzles and ultrasonic atomizers.

In a third embodiment, the aerosol is formed externally to the anode chamber of the fuel cell, fed to a particle size conditioner situated between the aerosol generator and the anode chamber, and subsequently fed to the anode chamber via a duct. In this embodiment, the particle size conditioner is capable of separating liquid fuel droplets based upon particle size, admitting only droplets having a preferred size distribution to the anode chamber.

In a fourth embodiment, the aerosol fuel exits the anode chamber of the fuel cell through an anode chamber exit vent and enters a fuel droplet recovery unit which acts to separate liquid fuel droplets from the suspending gas. Suitable droplet recovery units include filters, porous membranes, packed beds or electrostatic precipitators. The liquid fuel recovered in this manner may subsequently be recycled to the aerosol generator for reuse in the fuel cell.

In another embodiment, the aerosol feed fuel cell anode comprises an oxidation catalyst supported on a backing layer. In a preferred embodiment for high power density operation of the fuel cell, the backing layer is porous or readily wetted by the liquid fuel. In a variation of this preferred embodiment, the aerosol feed fuel cell further comprises a flow field element having a surface exposed to the anode, wherein the exposed surface of the flow field element is treated to make it hydrophobic, thereby directing coalesced liquid fuel into the zone of reaction on the anode surface.

Yet another embodiment pertains to a method of generating energy using an aerosol feed direct oxidation fuel cell. In a preferred variation of this embodiment, the aerosol feed is formed discontinuously by pulse atomization.

The details of one or more embodiments of the invention are set forth in the accompanying drawings and the description below. Other features, objects, and advantages of the invention will be apparent from the description and drawings, and from the claims.

DETAILED DESCRIPTION

Devices which are able to convert chemical energy into electrical energy are commonly referred to as batteries. Fuel cells are a special class of batteries in which high energy chemical reactants are continuously fed into the battery, where they undergo an electrochemical reaction to produce an electrical potential, and lower energy chemical products that are continuously removed. Batteries can comprise one or several individual cells. A single cell includes a negative electrode and a positive electrode. An electrolytic solution separates the electrodes. When the cell is discharging (converting chemical to electrical energy), an oxidation reaction occurs at the negative electrode (anode). At the positive electrode (cathode), a reduction reaction occurs during discharging.

For the electrode reactions of any corresponding pair of anode and cathode (an electrochemical couple), electrons pass through the external circuit from the anode to the cathode. Completion of the circuit occurs when ionic species, for example protons, are transferred across the cell through the intervening electrolyte. The change from electronic conduction to ionic conduction occurs at the electrodes and involves an electrochemical (Faradaic) reaction. However, electrons cannot pass through the electrolyte, or short-circuiting will result in cell self-discharge.

Many electrochemical fuel cells are based upon oxidation-reduction involving proton generation and transport through a proton-conductive electrolyte. One specific fuel cell type which makes use of a proton conductive electrolyte is described in U.S. Pat. No. 5,599,638, assigned to a common assignee and sharing a common inventor with the present application. That patent describes a liquid feed organic fuel cell in which the anode and cathode are separated by a solid electrolyte membrane that acts to pass protons but not electrons. A liquid organic fuel, such as a methanol/water mixture, is circulated past an anode of the cell while oxygen or air is circulated past a cathode of the cell. Preferably, the anode, membrane and cathode are joined in a single multi-layer composite structure, referred to herein as a membrane-electrode assembly (MEA). The membrane is preferably fabricated using Nafion™, a copolymer of tetrafluoroethylene and perfluorovinylether sulfonic acid.

As noted above, direct oxidation fuel cells may use either a vapor or liquid fuel feed. Electrodes produced for a vapor or gas feed are generally of the gas-diffusion type and cannot be effectively used in liquid feed fuel cell because the electrode is not adequately wetted by the fuel. U.S. Pat. No. 5,599,638 teaches a membrane electrode assembly comprising a platinum catalyst, and a liquid fuel feed design in which a dilute liquid mixture of organic fuel in sulfuric acid electrolyte is circulated past the anode. In general, the structure an properties of a fuel oxidation electrode (anode) for use in liquid feed fuel cells are quite different from those used in a gas/vapor feed fuel cell such as a hydrogen/oxygen fuel cell.

Direct oxidation fuel cells generate carbon dioxide on the anode side of the cell due to the electrochemical oxidation of the organic fuel at the anode. Conventional direct oxidation methanol fuel cells also generate water on the cathode side of the cell through several processes, including reduction of an oxidizing gas such as oxygen. This water needs to be removed continually for the efficient operation of such cells. Pressurized air or oxygen is generally used to remove the water by blowing across the cathode surface. The energy required to remove this water lowers the efficiency of methanol fuel cells, particularly at low temperatures (from 25° C. to about 45° C.), where the fuel cells are least efficient, and energy losses are most keenly felt.

Under typical conditions of liquid feed organic fuel cell operation, dilute liquid organic fuel mixed with an aqueous electrolyte is pumped into the anode chamber, where it diffuses into the membrane electrode (anode) and partially reacts. Most of the unreacted fuel leaves the anode compartment through a vent as fuel solution and is recycled to the anode compartment by a pump. Some of the unreacted fuel diffuses across the porous cell membrane to the cathode. This undesirable phenomenon is known as crossover, and acts to reduce the fuel efficiency of the fuel cell and to degrade cathode performance by fouling or poisoning the cathode.

In addition, the loss of fuel due to diffusion across the cell membrane causes a drop in the effective fuel concentration at the catalyst surface of the anode. This decline in fuel concentration at the surface of and within the membrane electrode creates a mass transfer resistance that acts to reduce overall performance of the fuel cell. This mass transfer resistance is manifested by a drop in voltage at the anode of the fuel cell.

In principle, it is possible to limit crossover by reducing the concentration of fuel in the fuel solution. However, this is not an effective solution, because reducing the fuel concentration in the fuel solution increases the mass transfer resistance at the membrane electrode (anode), thereby reducing the cell potential.

A potential solution to crossover is to admit to the anode compartment only a small volume of liquid fuel in a highly concentrated form. Under such conditions, the volume of liquid fuel fed to the anode compartment decreases significantly as the organic fuel is consumed in the membrane electrode. Consequently, significant consumption of fuel at the anode results in a significant decrease in the volume of fuel, but only a slight fuel concentration decrease in the liquid fuel solution. This is in contrast to the case of a dilute fuel feed solution, where a slight organic fuel consumption at the anode does not significantly reduce the fuel volume, but causes a significant drop in the effective organic fuel concentration in the membrane, thereby increasing the mass transfer resistance and decreasing the cell potential at the anode.

Reducing the volume of liquid admitted to the anode compartment of the fuel cell should result in reduced crossover because very little fuel is available at the cell membrane to cross over into the cathode compartment. In addition, the effective organic fuel concentration at or in the membrane electrode should be maintained at a high level, thereby reducing the mass transfer resistance and increasing the cell potential at the anode. As a practical matter, however, this approach is almost unworkable with a liquid feed of fuel to the cell, because the volume of fuel admitted to the anode compartment is so small as to make it impractical to pump the fuel and recirculate it through the anode compartment without causing pump cavitation. Filling the anode compartment with organic fuel-rich fuel solution, however, would lead to a catastrophic increase in crossover.

Figure 1:
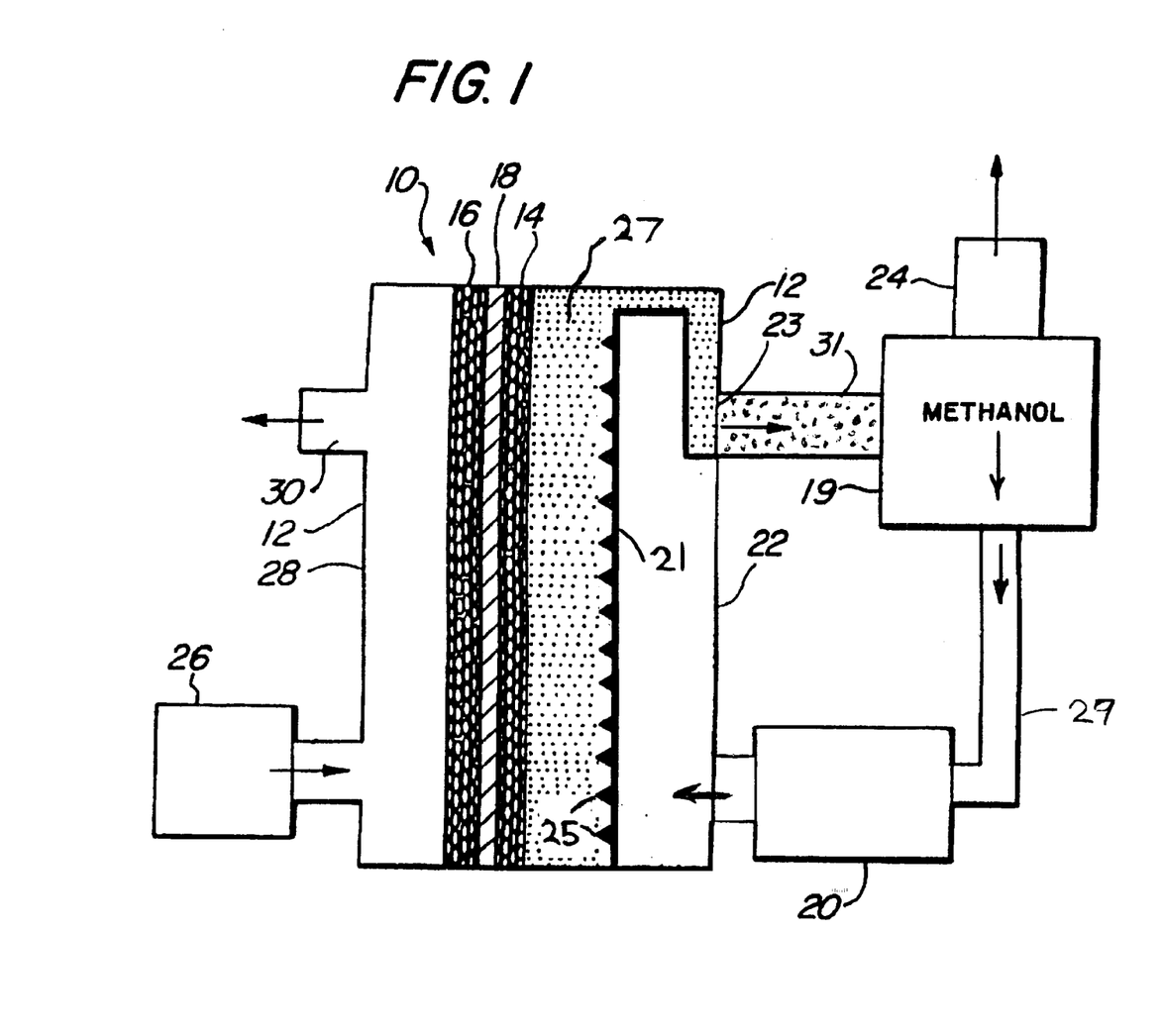
FIG. 1 provides a schematic representation of an aerosol feed direct oxidation fuel cell of the present invention, illustrating an internal aerosol generator and a fuel droplet recovery unit.

These and other problems with organic fuel crossover may be overcome using the present invention, which involves exposing the anode to an aerosol created by suspending liquid fuel droplets in a gas. FIG. 1 illustrates a particular embodiment of an aerosol feed organic fuel cell 10 having housing 12, anode 14, cathode 16 and solid polymer proton-conducting electrolyte membrane 18. As will be described in more detail below, anode 14, cathode 16 and solid polymer electrolyte membrane 18 are preferably a single multi-layer composite structure, referred to herein as a membrane-electrode assembly. A flow means, which may be a pressurized tank (not shown) or a pump 20 as shown, is provided for circulating an organic liquid fuel such as methanol to an aerosol generator 21 housed within the anode chamber 22 of housing 12. The aerosol generator comprises a plurality of atomizers 25, which form an aerosol 27 of liquid fuel droplets suspended in a gas that is passed over anode 14. A portion of the aerosol is withdrawn through anode compartment vent 23 and is passed through a duct 31 to a fuel droplet recovery unit 19 that separates the liquid fuel droplets from the suspending gas.

The gas, comprising carbon dioxide formed in the anode chamber, is vented through port 24 within droplet recovery unit 19. Liquid fuel is returned to the pump 20 via duct 29. An oxidizing gas such as oxygen or air is supplied to cathode chamber 28 within housing 12 by oxidant flow means 26 which may be, for example, a bottled oxygen supply, an air-blowing fan or an air compressor. Preferably, oxygen or air is circulated past cathode 16 at pressures in the range of 10 to 30 psig. Pressures greater than ambient improve the mass transport of oxygen to the sites of electrochemical reactions, especially at higher current densities. Water produced by the electrochemical reaction at the cathode is transported out of cathode chamber 28 by flow of oxygen or air through cathode chamber vent 30. A portion of this gas, along with water formed at cathode 16, is withdrawn through the cathode chamber vent 30.

An aerosol feed has the advantages of maintaining a high fuel concentration at the surface of the anode, reducing the mass transfer resistance and increasing the cell potential at the anode. However, an aerosol fed does not produce the high organic fuel crossover associated with large volume of concentrated liquid fuel feed. In an aerosol, the suspended fuel droplets are present in a relatively small volume compared to the total volume of the chemically inert suspending gas. Under such conditions, the volume of liquid fuel fed to the anode compartment is extremely small, thereby significantly reducing crossover. An aerosol feed also overcomes the difficulty associated with delivering to the anode surface a small volume of concentrated fuel without causing pump cavitation.

The liquid fuel droplets are preferably made up of low carbon number organic liquids such as methanol, formaldehyde or formic acid. Methanol is most preferred because of its high specific energy and because it is a renewable, agriculture-derived fuel. Other suitable liquid fuels include dimethoxymethane, trimethoxymethane and trioxane. The fuel droplets are generally made up only of the organic fuel; however, the droplets may comprise a major amount of fuel mixed or dissolved in a lesser amount of miscible diluent, typically water or an aqueous electrolyte.

Preferably the suspending gas is chemically inert, such as carbon dioxide, nitrogen or the Noble gases (helium, argon, krypton, neon, xenon). More preferably, the suspending gas is carbon dioxide generated by electrochemical reaction of fuel at the anode. In order to prevent gas pressure from building up within the fuel cell, carbon dioxide must be released from the anode chamber vent during fuel cell operation. This release will also allow some of the liquid fuel droplets to escape the anode chamber, resulting in poor fuel efficiency unless the droplets are recovered and recycled to the fuel cell. A fuel droplet recovery unit is provided to separate the liquid fuel droplets from the suspending gas exiting the anode compartment vent.

The fuel droplet recovery unit may effect droplet separation from the gas using any of many well-known gas/liquid separation methods. For example, the droplet recovery unit may effect gas/liquid separation on the principle of inertial deposition by providing a surface, such as the packing in a packed bed, for droplet coalescence. Alternatively, the gas/liquid separation may be effected by diffusion and capture into a porous filter or membrane. An electrostatic precipitator may also be used to effect droplet separation from the suspending gas, in which case electrically-charged liquid droplets are electrostatically attracted to an electrode charged to the opposite polarity of the liquid droplets.

Figure 2:
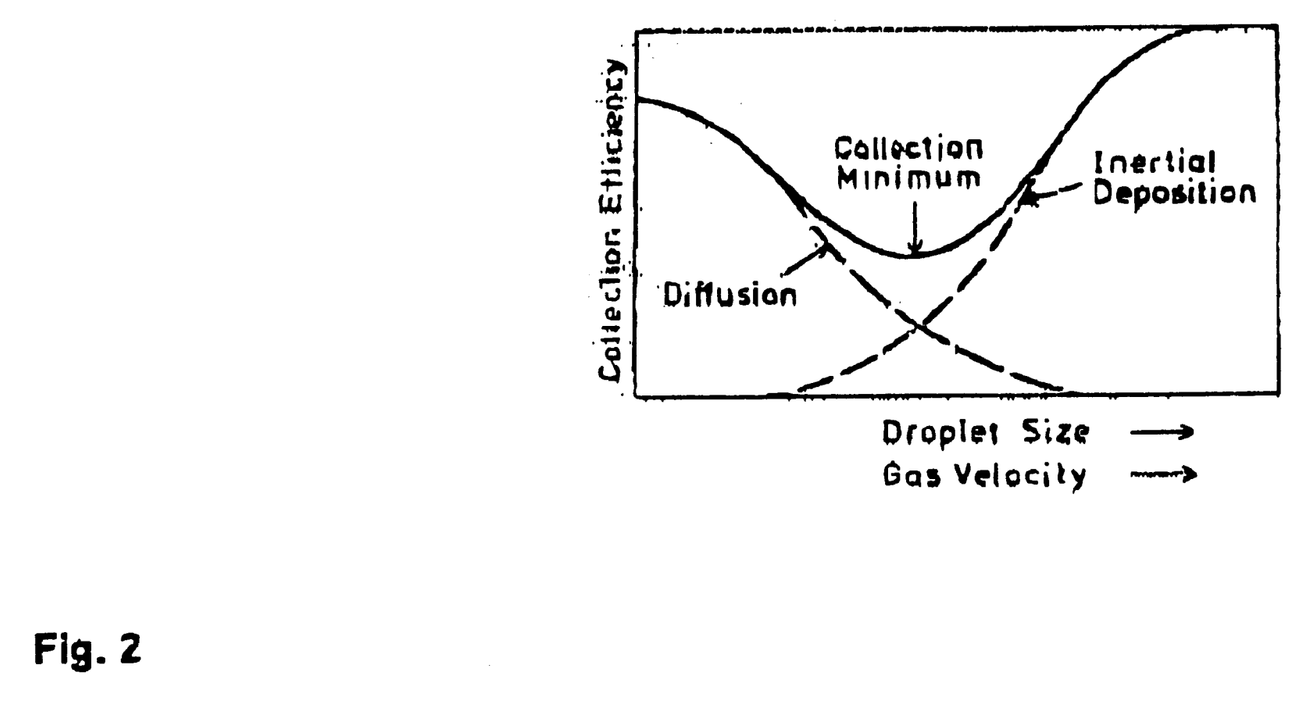
FIG. 2 is a graph illustrating the relationship between liquid droplet collection efficiency and droplet size and gas velocity for various droplet separation processes which may be used in a fuel droplet recovery unit.

The effectiveness of the fuel droplet recovery unit in achieving the separation of fuel droplets from the suspending gas will depend upon the fundamental operating principle behind the particular separation process, the fuel droplet size distribution entering the fuel droplet recovery unit, the superficial gas velocity through the recovery unit, and the residence time within the recovery unit. FIG. 2 illustrates this dependence of droplet collection efficiency on droplet size and gas velocity for inertial deposition and diffusion-controlled separation processes. For gas/liquid separations based upon electrostatic charge differential (electrostatic precipitation), the liquid droplets are preferentially electrostatically charged to a like polarity and uniform surface potential before exposure to the collection electrode having opposite polarity.

It should be noted that conventional liquid feed fuel cells in which the anode is submerged in a dilute fuel solution also require a method for separating liquid fuel from carbon dioxide gas formed at the anode. However, this separation involves a degassing step based upon gravitational or pressure differentials (e.g. vacuum degassing). Such degassing generates a mist containing entrained fuel droplets that results in an additional fuel loss unless an additional demisting step is performed on the carbon dioxide stream exiting the degassing unit. It is therefore evident that with the aerosol feed fuel cell, there is a potential for saving weight, volume and expense because the degassing and demisting steps will no longer be needed.

Figure 3:
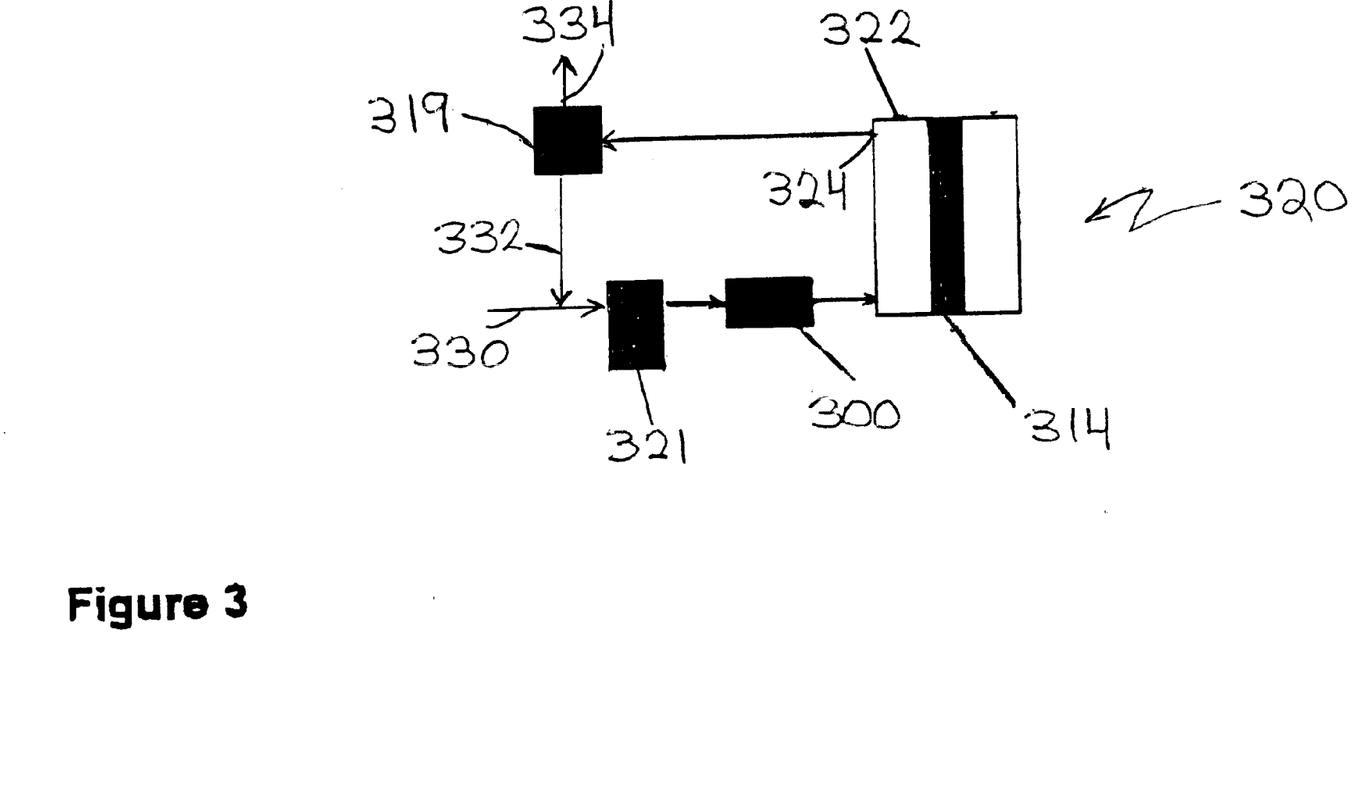
FIG. 3 provides a schematic representation of an aerosol feed fuel cell, illustrating a particle size conditioner situated between an external aerosol generator and the fuel cell, and a fuel droplet recovery unit situated after the anode exit vent of the fuel cell.

The fuel aerosol is formed by feeding liquid fuel to an aerosol generator. The aerosol generator may be situated internal to the fuel cell housing, for example within the anode compartment as shown in FIG. 1, or may alternatively be situated external to the housing of the fuel cell, as shown in FIG. 3.

Any number of means for forming an aerosol may be employed. For example, an aerosol may be formed by heat the fuel to a temperature above its boiling point in the presence of the suspending gas, then rapidly cooling the superheated fuel vapor to nucleate condensed droplets of liquid fuel suspended in the gas. The aerosol is preferably formed by atomizing the liquid fuel into the suspending gas.

A wide variety of atomization means are known to those skilled in the art and may be employed in this invention. These include orifices, single fluid atomization nozzles (airless sprayers), two fluid atomization nozzles (gas-assisted sprayers), rotating discs or wheels onto which the liquid is fed, or ultrasonic nozzles in which liquid is feed onto a needle or orifice oscillated at very high frequency (typically $\geq 20$ kHz) to form liquid droplets in a suspending gas.

The amount of aerosol fuel delivered to the anode is preferably less than the amount of fuel necessary to cause significant fuel crossover to the cathode, but more than the amount at which the mass transfer resistance is excessively high at the anode. This will in turn depend upon the particular oxidation catalyst used in the anode, the permeability of the membrane in the electrode assembly to liquid fuel, the fuel concentration in the aerosol droplets, and on the temperature and pressure within the cell. By monitoring fuel cell operating characteristics, however, it is possible to determine an optimum aerosol feed rate for a given fuel cell configuration and cell operating conditions. For example, monitoring fuel cell power output, cell potential, or operating current provide convenient measures of fuel cell operating performance suitable for use in controlling the rate of aerosol fuel delivery to the anode.

The amount of fuel delivered to the anode may be manipulated by adjusting the atomization conditions; for example, liquid feed rate, nozzle pressure, rotational speed of the disk, or oscillation frequency or power for an ultrasonic nozzle. Such methods are well known to those skilled in the art. Alternatively, the atomizer may be operated in a discontinuous manner, for example, by pulsing the liquid feed to the atomizer or pulsing the delivery of liquid fuel droplets from the atomizer. For example, the atomizing gas (for a two fluid atomization nozzle), rotational means (for a rotary nozzle) or oscillation means (for an ultrasonic nozzle) may be turned on or off alternately in a pulsed manner in order to maintain the desired fuel droplet delivery rate as reflected by the measured cell output potential and power output.

Preferably, the fuel droplet delivery rate is controlled by varying the duty cycle of the aerosol generator to maintain a desired cell output potential at a given power output. This can, for example, be accomplished using suitable monitoring sensors reporting cell output potential or cell power, combined with a control means such as a digital or analog computer which modifies the pulsation frequency or duty cycle of the aerosol generator to maintain the desired cell operating characteristics. Such sensors and control means are known to those skilled in the art.

It will be understood by those skilled in the art that a preferred droplet size or size distribution may exist for any particular fuel cell configuration or operating mode. In particular, aerosol droplets that are too small (typically less than 1 micron diameter) may undergo Brownian motion to such an extent that they remain suspended and pass through the fuel droplet recovery unit on the anode chamber vent without being recovered. Similarly, liquid fuel droplets that are too large (typically greater than 50 microns diameter) may rapidly coalesce to form even larger droplets that effectively flood the anode surface with highly concentrated fuel, thereby resulting in significant fuel crossover to the cathode due to the high concentration gradient across the membrane.

In order to preserve the benefits of an aerosol fuel delivery method, it is preferable to prevent the anode, anode catalyst pores and any anode support or backing materials, from becoming saturated with liquid fuel. If saturation were to occur, the anode would behave just like one in a liquid feed fuel cell where the anode is submerged in the liquid fuel filling the anode chamber, and fuel crossover to the cathode would substantially increase. Controlling fuel droplet size distribution, in particular reducing droplet coalescence, can prevent saturation or increase the time required to reach saturation.

The fuel droplet size for fuel leaving the aerosol generator may be manipulated by adjusting the atomization conditions; for example, liquid feed rate, nozzle pressure, rotational speed of the disk, or oscillation frequency or power for an ultrasonic nozzle. Such methods are well known to those skilled in the art. However, significant alteration of the fuel droplet size may occur by droplet coalescence after the fuel droplets leave the aerosol generator but before the droplets are actually delivered to the anode surface. Such coalescence may result from interception of the flowing gas, inertial deviations of the droplets from their desired flow trajectories, or Brownian motion for extremely fine droplets. For example, the droplet size distribution may increase due to droplet coalescence as the aerosol transits the anode chamber and meets other fuel cell elements such as the housing or any anode support structures. In addition, suspended liquid fuel droplets may collide with each other and coalesce after leaving the aerosol generator if the number of aerosol droplets is too high.

Thus, the preferred fuel droplet size when the droplets leave the aerosol generator will often be smaller than the droplet size when the droplets actually reach the anode surface. Consequently, it is desirable to operate the aerosol generator in a manner that does not create an excessive number of liquid fuel droplets that are too small or too large. Alternatively, liquid fuel droplets that are too small or too large may be removed from the aerosol before they deposit on the anode surface.

This separation may be achieved using any of many well-known aerosol classification methods. For example, separation of the larger or smaller aerosol droplets from droplets having the preferred droplet size range may be based on the principle of inertial deposition, in which a the aerosol is passed through a packed bed of appropriate collection surface dimensions. Alternatively, the droplet size separation may be effected by diffusion and capture into a porous filter or membrane, using diffusers with the appropriate pore size and tortuosity.

An electrostatic separator may also be used to effect droplet separation from the suspending gas. In this case, electrically-charged liquid droplets pass through an electric field created by charged electrodes, and are electrostatically attracted to either the electrode charged to the opposite polarity, or repelled from the electrode having the same polarity. Electrostatic separation is generally based upon balancing the electrophoretic motion of the droplets (generally scaling with droplet radius) against their inertia (scaling with droplet radius-cubed) or aerodynamic drag (scaling with droplet radius-squared).

Any of the preceding methods for effecting droplet separation based upon droplet size or charge may be employed, either alone or in combination. These separation methods are generically embodied in a particle size conditioner, situated between the aerosol generator and the anode of the fuel cell. FIG. 3 illustrates schematically an aerosol feed fuel cell in which a liquid fuel 330 is fed to an aerosol generator 321 which forms a suspension of liquid fuel droplets in a suspending gas. The aerosol then passes to a particle size conditioner 300, situated between the aerosol generator 321 and the anode chamber 322 of the fuel cell 320. The particle size conditioner 300 operates to separate a portion of the liquid fuel droplets from the aerosol before the aerosol contacts the anode of the membrane electrode assembly 314. A fuel droplet recovery unit 319 situated after the anode chamber exit vent 324, operates to separate fuel from the suspending gas after the aerosol exits the anode chamber 322. The recovered liquid fuel is recycled 332 to the aerosol generator 321, and the suspending gas is vented 334. Liquid fuel recovered from the particle size conditioner 300 may also be recycled to the aerosol generator 321, although this is not shown in FIG. 3.

Despite the above approaches of carefully controlling fuel droplet size at the aerosol generator, or using a particle size conditioner to alter the liquid droplet size distribution of the aerosol feed to the anode, some droplet coalescence may still occur in the anode chamber. Droplet coalescence is particularly likely to occur on the internal surface of the anode chamber housing, on any anode backing layers of the membrane electrode assembly, and on the anode support elements. This may require modification of the anode chamber housing, anode backing layer or anode support elements to prevent saturation of the anode with liquid fuel. In addition, because the membrane electrode assembly is generally porous, and in particular, the anode is porous with much of the electro-oxidation reaction occurring within the pores, it may be necessary to modify the pore size distribution of the anode in addition to controlling the fuel droplet size distribution in the aerosol feed to the anode.

In order to understand the nature of these modifications, it will be necessary to first consider the structure and function of the membrane electrode assembly. Although any number of liquid organic fuels or oxidizing gases may be employed in the inventive fuel cell, the particular example will be described using methanol as the organic fuel and oxygen as the oxidizing gas. In addition, the present invention will be described relative to a preferred membrane electrode assembly disclosed in pending U.S. patent application, Ser. No. 09/199,074, filed on Nov. 23, 1998, sharing common inventors and a common assignee with the present application, which is hereby incorporated by reference.

As noted above and shown in FIG. 1, anode 14, cathode 16 and membrane 18 form a single composite layer structure. Prior to use, anode chamber 22 is filled with a chemically inert gas such as carbon dioxide or nitrogen, and cathode chamber 28 is filled with an oxidizing gas such as air or oxygen. During operation, organic fuel such as methanol is supplied to the anode 14 by aerosol generator 21, while an oxidizing gas such as oxygen or air is supplied to the cathode 16. When an electrical load (not shown) is connected between anode 14 and cathode 16, electro-oxidation of the organic fuel (methanol) occurs at anode 14 and electro-reduction of the oxidizing gas (oxygen) occurs at cathode 16.

The following exemplary electrochemical reaction takes place at the anode, releasing electrons:

$$\text{Anode: } CH_3OH + H_2O \rightarrow CO_2 + 6\ H^+ + 6\ e^-$$

Carbon dioxide gas produced by the above reaction is withdrawn along with a portion of the fuel aerosol (suspension of methanol droplets in a gas comprising carbon dioxide) from anode chamber vent 23. The liquid methanol droplets may pass through a duct 31 to a droplet recovery unit 19 where liquid methanol is separated from the gas. Liquid methanol may be returned to the methanol pump 20 through duct 29.

Simultaneous with the electrochemical reaction described in the anode equation above, another electrochemical reaction involving the electro-reduction of oxygen, which captures electrons, occurs at cathode 16 and is given by:

$$\text{Cathode: } O_2 + 4\ H^+ + 4\ e^- \rightarrow 2\ H_2O$$

Overall, in the cell, the reaction is therefore written as:

$$CH_3OH + 1.5\ O_2 \rightarrow CO_2 + 2H_2O$$

The occurrence of different reactions at the anode and cathode gives rise to a voltage difference between the two electrodes. Electrons generated by electro-oxidation at anode 14 are conducted through the external load (not shown) and are ultimately captured at cathode 16. Hydrogen ions or protons generated at anode 14 are transported directly across membrane electrolyte 18 to cathode 16. Thus, a flow of current is sustained by a flow of ions through the cell and electrons through the external load.

The electro-oxidation reaction takes place over a catalyst located in the fuel cell anode. Catalysts are well known in the art as providing activated surfaces upon which these reactions can take place. Preferred catalysts for electro-oxidation of methanol are platinum-ruthenium catalysts. Various formulations allowing combination of those two metals are possible. The platinum-ruthenium catalyst may be in the form of a fine metal powder, i.e. "unsupported," or as metal atoms or clusters dispersed on a support, i.e. "supported." "Supported" catalysts generally make use of a porous support material in order to achieve high surface area, that is, a high proportion of available metal sites for catalytic chemical reaction. For supported platinum-ruthenium methanol electro-oxidation catalysts, the loading of the alloy particles in the electro-catalyst layer is preferably in the range of 0.5–4.0 $mg/cm^2$. More efficient electro-oxidation is obtained at higher metal loading levels.

The support may be a high surface area carbon black such as Vulcan XC-72A (Cabot Corp., Billerica, Mass.). A carbon fiber sheet or backing (not shown in FIG. 1) may also be used to make electrical contact with the particles of the electrocatalyst. Commercially available Toray™ paper (Toray, 500 Third Ave., New York, N.Y.) may be used as the electrode backing sheet. A supported alloy electrocatalyst applied to a Toray™ paper backing is commercially available (E-Tek, Inc., Framingham, Mass.). Alternately, both unsupported and supported electrocatalysts may be prepared by chemical methods, combined with Teflon™ binder, and spread on Toray™ paper backing to produce the anode.

The inventors have found that a bimetallic powder, having separate platinum particles and separate ruthenium particles produced a better result than a platinum-ruthenium alloy. The preferred Pt-Ru material used according to the present invention has a high surface area to facilitate contact between the material and the fuels. Both platinum and ruthenium are preferably used in the catalytic reaction, and the inventors have found that it is important that the platinum and ruthenium compounds be uniformly mixed and randomly spaced throughout the material, i.e., the material must be homogeneous. A carbon-supported catalyst is preferred because catalyst consumption is thereby minimized, and adhesion to the substrate is increased.

Platinum-based alloys in which a second metal is tin, iridium, osmium or rhenium can be used instead of platinum-ruthenium. In general, the choice of the alloy depends on the fuel to be used in the fuel cell. In principle, any metal which disassociates methanol and water, or activates carbon-hydrogen bonds and thereby catalyzes oxidation and reduction, can be used in place of the platinum. Suitable alternatives to platinum including palladium, tungsten, rhodium, iron, cobalt, and nickel. Molybdenum ($MoO_3$), niobium ($Nb_2O_5$), zirconium ($ZbO_2$), and rhodium (Rh) may also be capable of dissociating H—OH as M—OH. Combinations of these are, therefore, good (bi-functional) catalysts.

The cathode is a gas diffusion electrode in which platinum particles are bonded to one side of the membrane, and is preferably formed from unsupported or supported platinum bonded to a side of the membrane opposite to the anode. The cathode is preferably formed from unsupported or supported platinum bonded to a side of the membrane opposite to the side of the membrane facing the anode. Unsupported, fuel cell grade platinum black (Johnson Matthey, Inc., U.S.A.) or supported platinum electrodes (E-Tek, Framingham, Mass.) are suitable cathode materials. Cathode metal particles are preferably mounted on a carbon backing material. The loading of the electrocatalyst particles on the carbon backing is preferably in the range 0.5–4.0 mg/cm$^2$. The electrocatalyst and the carbon fiber backing preferably contain 10–50 weight percent Teflon™ to provide the hydrophobicity needed to create a three-phase boundary and to achieve efficient removal of water produced by the electro-reduction of oxygen, from the cathode chamber.

It is important to recognize that conventional fuel cell electrode assemblies known in the art are usually of the gas-diffusion type suitable for use in gas feed "reformer" type fuel cells. Such electrodes cannot be effectively used in either liquid feed or aerosol feed fuel cells, because the electrode material is not adequately wetted by the liquid fuel or fuel droplets. In general, the structure and properties of a fuel oxidation electrode (anode) for use in liquid or aerosol feed fuel cells are quite different from those used in gas feed fuel cells. The electrode structures for use in a liquid or liquid droplet fuel cell should generally be very porous, and the liquid fuel should wet all of the pores. Carbon dioxide evolved at the fuel electrode should be effectively released from the reaction zone. Adequate wetting of the electrodes by the fuel is known to be a major problem for liquid fuel cells, even those using a sulfuric acid electrolyte blended with the fuel. It is expected that similar problems exist for electrodes used in an aerosol feed fuel cell.

Protons generated at anode 14 and water produced at cathode 16 are transported between the two electrodes by proton-conducting solid electrolyte membrane 18. Maintaining high proton conductivity of membrane 18 is important to the effective operation of an organic/air fuel cell such as the direct methanol feed fuel cell. The water content of the membrane is maintained by providing contact directly with the liquid fuel and water mixture pumped through anode chamber 22 by pump 20. The thickness of the proton-conducting solid polymer electrolyte membrane 18 should preferably be in the range 0.05–0.5 mm. Membranes thinner than 0.05 mm may result in membrane electrode assemblies which are poor in mechanical strength, while membranes thicker than 0.5 mm may suffer extreme and damaging dimensional changes induced by swelling of the polymer material by the liquid fuel and water solutions and also exhibit excessive resistance. The ionic conductivity of membrane 18 should be greater than 1 ohm$^{-1}$ cm$^{-1}$ for the fuel cell 10 to have a tolerable internal resistance.

Membrane 18 is preferably formed from NAFION™ (a copolymer of tetrafluoroethylene, and perfluoropolyether sulfonic acid), modified perfluorinated sulfonic acid polymer, polyhydrocarbon sulfonic acid or composites of two or more kinds of proton exchange membranes. Other suitable membrane materials have been described in U.S. Pat. No. 5,795,496, sharing a common inventor and a common assignee with the present invention. This reference also discloses methods for fabricating improved membranes for direct oxidation fuel cells.

As noted above, membrane 18 should have a low permeability to the liquid fuel. Although a Nafion™ membrane has been found to be effective as a proton-conducting solid polymer electrolyte membrane, perfluorinated sulfonic acid polymer membranes such as Aciplex™, manufactured by Asahi Glass Co. (Japan), and polymer membranes made by Dow Chemical Co. (Japan and USA), such as XUS13204.10, which have similar properties to Nafion™, are also applicable. Membranes of polyethylene and polypropylene sulfonic acid, polystyrene sulfonic acid and other polyhydrocarbon-based sulfonic acids (such as membranes made by RAI Corporation, USA) can also be used depending on the temperature and duration of fuel cell operation. Composite membranes consisting of two or more types of proton-conducting cation-exchange polymers with differing acid equivalent weights, or varied chemical composition (such as modified acid group or polymer backbone), or varying water content, or differing types and extent of cross-linking (such as cross-linked by multivalent cations, e.g., $Al^{3+}$, $Mg^{2+}$, etc.) can be used to achieve low fuel permeability. Such composite membranes can be fabricated to achieve high ionic conductivity, low permeability for the liquid fuel and good electrochemical and mechanical stability.

As can be appreciated from the foregoing description, an aerosol feed direct oxidation organic fuel cell is achieved using a proton-conducting solid polymer membrane as electrolyte without the need for a free soluble acid or base electrolyte. The only electrolyte required is the proton-conducting solid polymer membrane 18. No acid is present in free form in the liquid fuel and water mixture. Since no free acid is present, acid-induced corrosion of cell components, which can occur in current-art acid-based organic/air fuel cells, is avoided. This offers considerable flexibility in the choice of materials for the fuel cell and the associated sub-systems. Furthermore, unlike fuel cells that contain potassium hydroxide as a liquid electrolyte, cell performance does not degrade because soluble carbonates are not formed. A solid polymer electrolyte membrane also minimizes parasitic shunt currents. Nevertheless, it will be understood by those skilled in the art that an aerosol fuel feed may be used with a conventional fuel cell using a liquid electrolyte comprising a free soluble acid or base electrolyte, either combined with the fuel or part of the membrane electrode assembly, although this is not a preferred embodiment.

As noted above, fuel crossover lowers the operating potential of the oxygen electrode and results in the unnecessary consumption of fuel without producing useful electrical energy. In general, fuel crossover is a parasitic reaction which lowers efficiency, reduces performance, and generates heat in the fuel cell. It is therefore desirable to minimize the rate of fuel crossover.

The rate of fuel crossover is proportional to the permeability of the solid electrolyte membrane to the liquid fuel, and increases with increasing concentration and temperature. Crossover can be reduced by taking into consideration a number of factors, for example, by choosing a sold electrolyte membrane with low water content, the permeability of the membrane to the liquid fuel can be reduced. Reduced fuel permeability of the membrane results in a lower crossover rate. Also, fuels having a large molecular size have a smaller diffusion coefficient than fuels which have small molecular size. Hence, permeability can be reduced by choosing a fuel having a large molecular size. Moreover, while water soluble or water miscible fuels are desirable, fuels with moderate solubility exhibit lowered permeability. Moreover, fuels with high boiling points do not vaporize and transport through the membrane in the liquid phase. Since the permeability for vapors is higher than liquids, fuels with higher boiling points also generally have a lower crossover rate.

Improved materials and methods for fabrication of membrane electrode assemblies suitable for use with liquid feed direct oxidation fuel cells are disclosed in U.S. Pat. No. 5,773,162. Because the improved electrodes exhibit an optimum distribution of hydrophobic and hydrophilic sites, the anode structure is adequately wetted by the liquid, thereby sustaining the electrochemical reaction. Such improved electrodes are anticipated to perform well with an aerosol fuel feed comprising liquid droplets suspended in a gas. However, use of an aerosol fuel feed with a porous anode material presents some unique problems for fuel cell operation at the two extremes of power density, problems not encountered with a liquid feed, submerged anode fuel cell.

Figure 4:
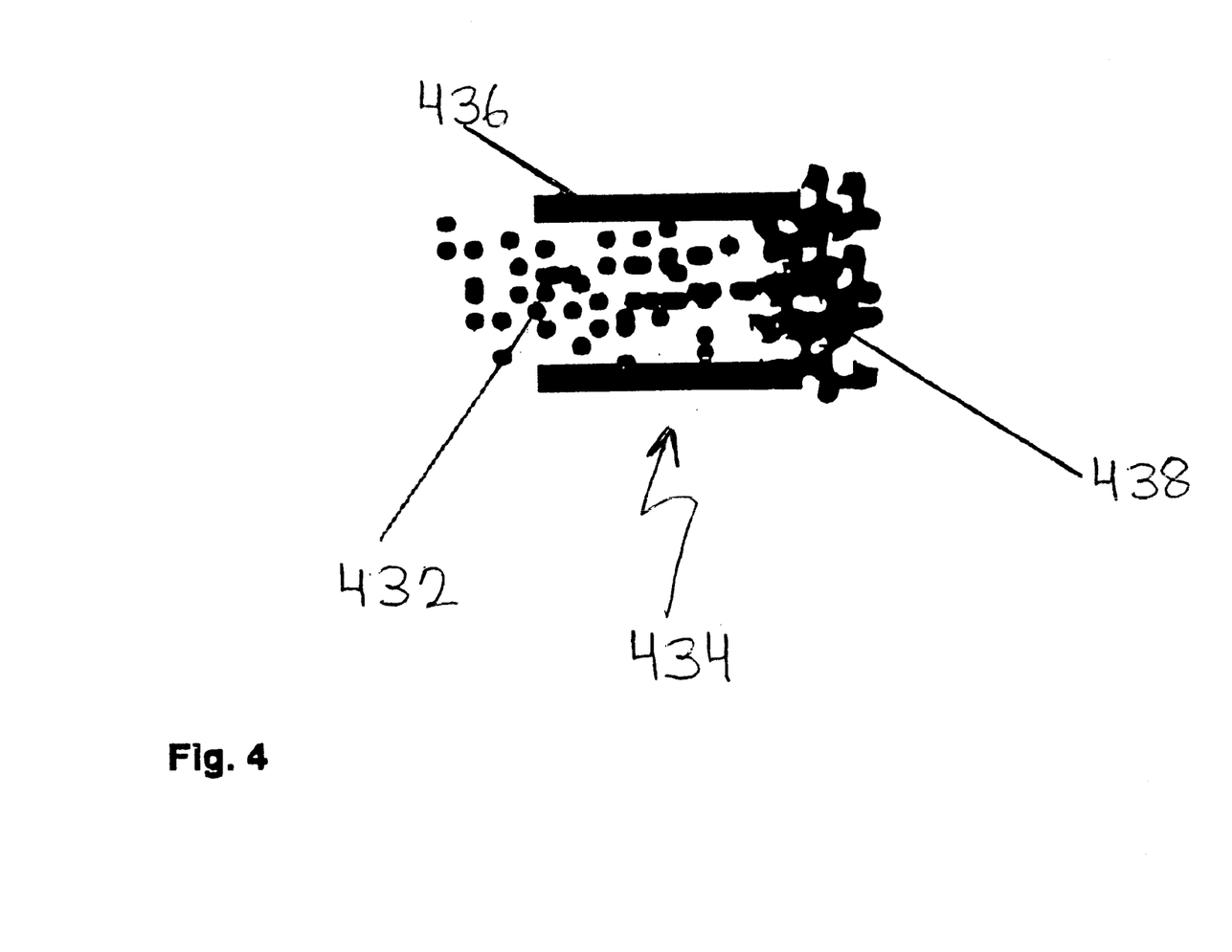
FIG. 4 provides a schematic representation of an aerosol fuel feed being transported by diffusion within a pore having a diameter defined by the walls of a backing structure adhered to a catalyst layer to form an electrode.

FIG. 4 illustrates the case of low power density operation, when the rate of electrochemical reaction may be governed by the rate of diffusion of liquid droplets 432 intro an individual pore 434 of the porous anode backing material 436 to the catalyst layer 438. For low power density operation, therefore, the mean diameter of the liquid fuel droplets 432 should be significantly smaller than the mean pore diameter of the backing layer material. Preferably, the mean diameter of the liquid fuel droplets exiting the aerosol generator is less than 0.01–0.1 times the mean pore diameter of the backing layer material.

It will be understood by those skilled in the art that this condition can be met by controlling the pore size distribution of the backing layer material, or by controlling the droplet size distribution and concentration within the anode chamber. In this way, significant coalescence of the liquid fuel droplets does not occur prior to the droplets reaching the catalyst layer, thereby preventing plugging of the pores by liquid that could prevent the fuel from reaching the catalyst layer.

Figure 5:
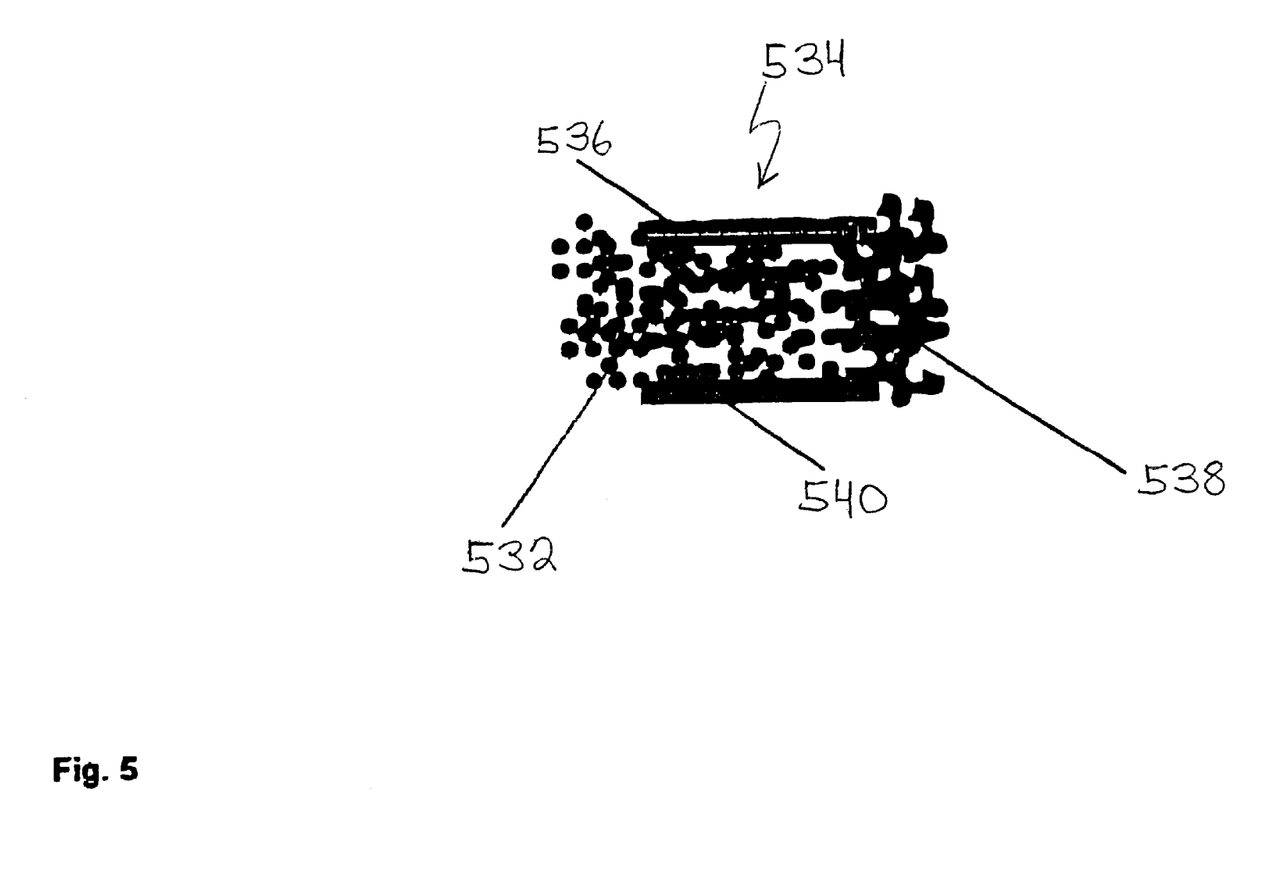
FIG. 5 provides a schematic representation of an aerosol fuel feed being transported by diffusion and capillary wicking within a pore defined by the walls of a hydrophilic backing structure adhered to a catalyst layer to form an electrode.
Figure 6:
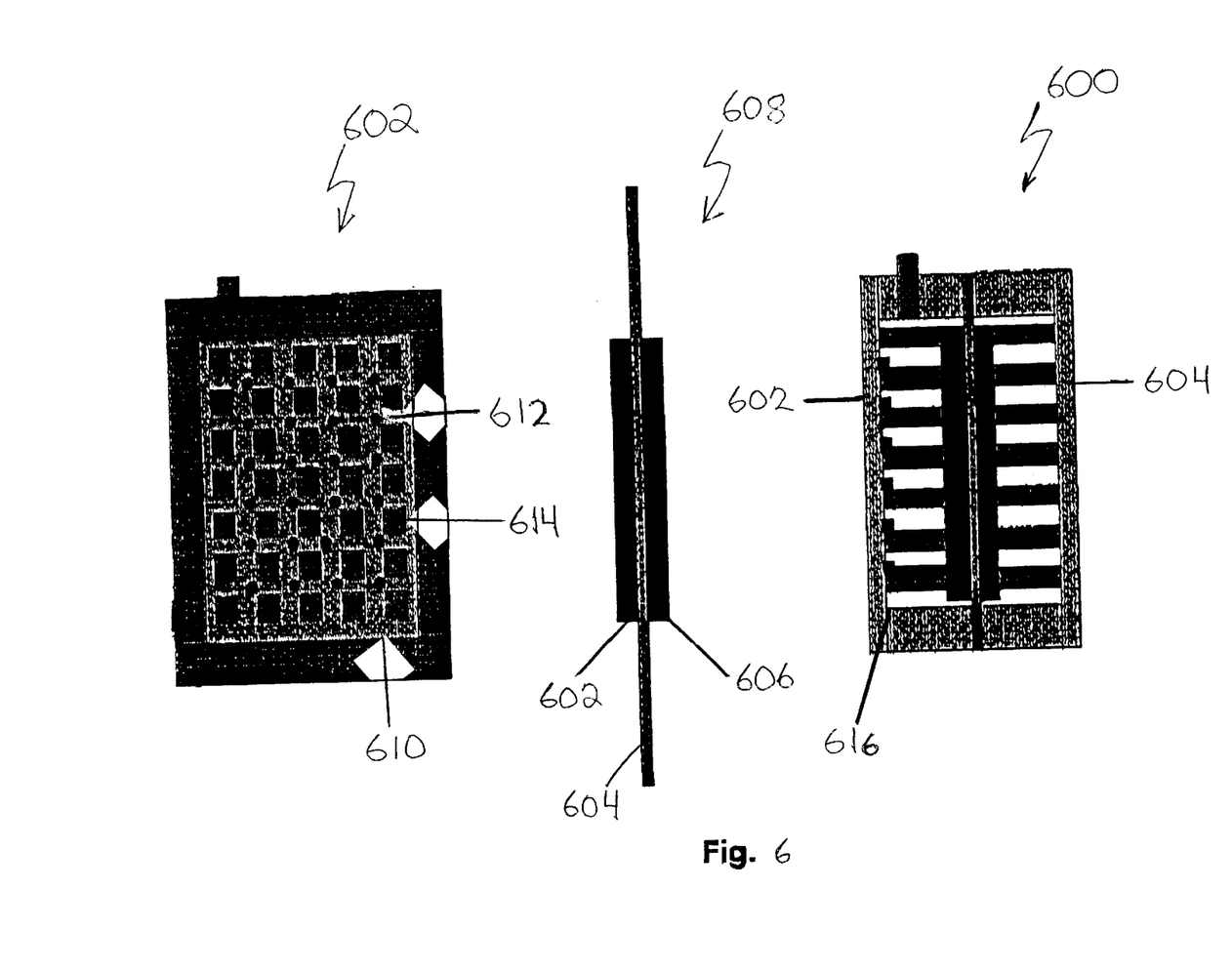
FIG. 6 provides a schematic representation of a preferred fuel cell system incorporating a stack of individual membrane electrode assemblies and a flow field element having an integral aerosol generator comprising a plurality of in situ atomizers.

FIG. 5 illustrates the case of high power density operation, where a higher concentration of liquid fuel droplets will be required within the anode chamber. However, this condition will cause a higher rate of droplet coalescence before the fuel droplets reach the catalyst layer. As noted previously, droplet coalescence between the time the droplets leave the aerosol generator and the time they reach the anode can be controlled by adjusting the atomization duty cycle or operating conditions, for example, liquid feed rate, nozzle pressure, rotational speed of the disk, or oscillation frequency or power for an ultrasonic nozzle. However, droplet coalescence within the pores of the backing material can still occur, leading to plugging of the pores by a liquid film or flooding of the anode with fuel, causing excessive fuel crossover to the cathode.

As shown in FIG. 5, liquid fuel droplets 532 diffuse into an individual pore 534 of the porous anode backing material 536 to the catalyst layer 538. Because of the high number concentration of fuel droplets in the pore 534, most of this droplet coalescence will occur on the pore walls 540. In order to allow spreading of the coalesced liquid and permit this liquid to reach the catalyst surface, it is preferable that the pore walls 540 of the backing material 536 be readily wetted by the coalesced liquid fuel. This can be achieved by coating the backing layers with hydrophilic materials such as Nafion™ ionomer, cellulosic materials, small amounts of water soluble surfactants, humectants such as glycerol or poly(alkylene) glycols, or various catalytic metals such as platinum or palladium. Such treatments will not only keep the pores from plugging, but also facilitate easy removal of the product carbon dioxide gas from the catalyst layer.

The use of an aerosol fuel feed can also lead to a reduction in water accumulation at the cathode. Water is produced electrochemically at the cathode, but may be present in the fuel feed and transfer across the membrane to the cathode by diffusion or electroosmosis. Water provided to the cathode by these two processes may cause significant problems in fuel cell operation. First, this water tends to flood the cathode, creating a liquid film boundary layer that blocks access of oxygen gas to the cathode surface, thereby causing a significant reduction in fuel cell performance. Second, relatively high oxidant (oxygen or air) flowrates are required to minimize or prevent flooding at the cathode, leading to a significant water loss from the fuel cell.

These problems are avoided or minimized by using an aerosol fuel feed. If a highly concentrated methanol solution or pure methanol fuel is used, water will be able to back-diffuse to the anode as it does in conventional gas feed or "reformer" type fuel cells. This permits the use of lower air flow rates with a consequent reduction in water carry-out from the fuel cell. Cell output performance should also improve due to the reduced water concentration at the cathode.

A fuel cell works properly only if fuel has been properly delivered to the membrane to be reacted and/or catalyzed. U.S. patent application, sharing a common inventor, assigned to a common assignee, and incorporated herein by reference, discloses a preferred liquid feed direct oxidation fuel cell configuration in which membrane electrode assemblies are stacked to obtain uniform fuel delivery. Each membrane electrode assembly is sandwiched between a pair of flow-modifying plates which comprise biplates and endplates, respectively. A flow of liquid fuel is established in each space between each biplate/endplate and the corresponding membrane electrode assembly. The collection of biplates/endplates and membrane electrode assemblies forms a "stack".

The biplates and endplates are preferably formed of an electrically conductive material in order to couple all the membrane electrode assemblies in series with one another. However, the biplates and endplates need not be entirely electrically conductive. Only those points which are actually in contact with the fuel cell electrodes are required to be conductive. The biplates necessarily include conductive elements which allow electrical communication between the media on each side of the biplate. The endplates necessarily include conductive elements which allow electrical communication between the medium on one side of the endplate and an electrical load which is applied. This connection can be made through the back of an endplate, or through a side of the endplate.

Electrical current must pass from one side of a biplate to the other side. The conductive elements pass through the biplate and extend into the media on each side of the plate. As noted above, the biplate itself does not need to be conductive. The conductive elements can be arranged in any suitable pattern throughout the biplate The biplate is a two-sided separator that prevents contact between the anode and cathode of the fuel cell. In many embodiments, the biplate will be substantially planar, with a positive electrode on one side of the plane, and the corresponding negative electrode on the other side of the plane. The biplate includes provisions for fluid flow at both of its oppositely-facing surfaces. These comprise a series of intersecting flow channels, or flowfield element. The flowfield element allows fuel or air to disperse over the membrane electrode assembly.

At the end of each stack is an endplate having chambers on one side only. Two endplates are generally present in the stacked arrangement. An endplate will typically have a flowfield element on one of its surfaces, preferably the surface forming a wall of one of the fuel cell chambers. The conductive elements forming this flowfield element will provide electrical communication with at least one electrical terminal. These terminals can be electrically connected to an external load. Thus, in a stacked fuel cell configuration, electrical communication between anodic and cathodic endplates is made through an electrical load. This load is typically transportation, heating, and other useful loads.

The biplate and endplate include a plurality of separators and a plurality of chamber-forming areas. The separators have the function of pressing against the membrane electrode assembly. An endplate is substantially planar in many embodiments, and includes conductive elements. Typically, one endplate will include an anode, and another endplate will include a cathode.

A preferred biplate assembly includes a) a substantially planar biplate, b) a plurality of conductive elements which provide electrical communication from one side of the biplate to the other, c) an air entrance port located at one edge of the biplate, to allow air to enter and remove water which accumulates during operation of the fuel cell, and d) an air exit which is located at another edge of the biplate, to allow air and water to leave the immediate area of the biplate.

A preferred aerosol feed fuel cell configuration in which membrane electrode assemblies are stacked to obtain uniform fuel delivery is shown in FIG. 6. The fuel cell 600 is formed by joining an anode biplate 602 and a cathode biplate 604. The membrane electrode assembly 608 is formed by joining an anode assembly 602 and a cathode assembly 606 to opposite surfaces of the interposed membrane 604. Each anode biplate 602 has an internal surface comprising a flowfield element 610 and an aerosol generator.

FIG. 6 illustrates a preferred aerosol generator comprising a plurality of individual in situ atomizers, each atomizer 612 situated at the internal surface of the anode biplate 602 so as to atomize liquid fuel droplets into the anode chamber 616. Each in situ atomizer 612 may be selected from a wide variety of atomization means, including orifices, single fluid atomization nozzles (airless sprayers), two fluid atomization nozzles (gas-assisted sprayers), rotating discs or wheels onto which the liquid is fed, or ultrasonic nozzles in which liquid is feed onto a needle or orifice oscillated at very high frequency (typically ≧20 kHz) to form liquid droplets in a suspending gas.

FIG. 6 illustrates an aerosol generator made up of a plurality of nozzles. Each nozzle is an atomizer 612 and is situated at an intersection of at least two flow channels on the inner surface of the flow field element. The intersecting flow channels create islands 614 The outlet of each nozzle faces the anode side of the membrane electrode assembly 608. The aerosol fuel from each nozzle is preferably supplied directly against the surface of the membrane electrode at an island 614 formed by the intersecting flow channels. The islands in FIG. 6 are rectangular in shape, but other shapes may also be used.

The inner surface of the flow field element is preferably a hydrophobic surface not wetted by the liquid fuel. A hydrophobic treatment of the flow field element surface, particularly when combined with the use of a hydrophilic catalyst backing layer, promotes wicking of coalesced liquid fuel into the pores of the backing layer where it can be drawn into the reaction zone at the catalyst surface. A polymer of tetrafluoroethylene is particularly well suited for coating onto the inner surface of the flow field element to make the surface hydrophobic.

As noted above, water tends to accumulate in fuel cell chambers at or near the cathode. For efficient fuel cell operation, this water is desirably continuously removed from the cathode chamber. According to a particular embodiment, the plates (biplates or endplates) of the liquid feed fuel cells are provided with a hydrophilic surface. Such surfaces have the desirable property of discouraging droplet formation, and allowing the formation of a sheet of water which is more easily drained by gravity. Thus, as soon as water is released at the cathode, it becomes part of a liquid layer that drains to the bottom of the biplate or endplate.

Examples of hydrophilic materials which can be applied to the plate surfaces include fluoropolymers such as perfluoropolyether sulfonic acid; polystyrenes such as polystyrene carboxylic acid and polystyrene sulfonic acid; polyallylamine; linear and branched polysaccharides such as dextran, pullulan, and polymaltotriose; cellulose and derivatives such as hydroxypropyl cellulose; acrylic acid polymers and acrylamide polymers including alkyl substituted acrylamides such as N,N-dimethyl acrylamide, polymethacrylic acid, N-isopropyl acrylamide, and the like; polyethylene oxides including hydroxy and methoxy terminated polyethylene oxides; polyethylene glycol, polypropylene glycol; polyvinyl compounds such as polyvinyl acetate, polyvinyl alcohol and polyvinyl butyral; polypyridine and polypyridinium compounds such as poly-2-vinyl-N-methyl pyridinium halide, poly-4-vinyl-N-methyl pyridinium halide, poly-2-vinylpyridine, polyvinyl pyrrolidone and salts of those compounds listed above which can form salts. Many of these compounds form random or block copolymers with each other or other polymers, and these are also useful for forming hydrophilic layers on surfaces. For example, copolymers of the following can be used: tetrafluoroethylene with perfluoropolyether sulfonic acid, polystyrene with poly-4-vinylpyridine, polyisoprene with poly-2-vinylpyridine, polybutadiene with poly-4-vinylpyridine, polymethylmethacrylic acid with poly-2-vinylpyridine, poly-t-butylmethacrylate with poly-2-vinylpyridine, polyethylene with poly-2-vinylpyridine, polyethylene oxide with polystryene, and a number of other useful copolymers.

These materials are most desirably applied as a liquid solution, and allowed to dry. Suitable liquid solutions can be made, for example, with water. Hydrophilic polymer solutions of from about 0.5% to about 50% are suitable for application. Drying of the polymer layer can be carried out by ambient drying, or with the use of applied heat, such as with a heat gun or similar device.

Although only a few embodiments have been described in detail above, those having ordinary skill in the art will certainly understand that many modifications are possible without departing from the teachings herein. All such modifications are intended to be encompassed within the following claims.

What is claimed is:

1. An aerosol feed direct oxidation fuel cell assembly comprising:

a cathode;

an anode;

an electrolyte; and, an aerosol generator providing an organic fuel in the form of an aerosol to said anode, said aerosol comprising liquid fuel droplets dispersed in a suspending gas.

2. The fuel cell assembly of claim 1 wherein said electrolyte comprises a solid polymer hydrogen ion conductor membrane.

3. The fuel cell of claim 2 wherein said membrane is disposed between said anode and said cathode.

4. The fuel cell assembly of claim 2 wherein said membrane comprises a copolymer of tetrafluoroethylene and perfluorovinylether sulfonic acid.

5. The fuel cell assembly of claim 2 wherein said membrane comprises a polyhydrocarbon sulfonic acid polymer.

6. The fuel cell assembly of claim 2 wherein said membrane comprises a composite of two or more hydrogen ion conductor membranes.

7. The fuel cell assembly of claim 1 wherein said anode further comprises a catalyst for oxidation of said liquid fuel.

8. The fuel cell assembly of claim 7 wherein said catalyst comprises a metal selected from the group consisting of iridium, osmium, palladium, platinum, rhenium, rhodium, ruthenium, and tin.

9. The fuel cell assembly of claim 7 wherein said catalyst is supported on a backing layer.

10. The fuel cell assembly of claim 9 wherein said backing layer is porous.

11. The fuel cell assembly of claim 9 wherein said backing layer is hydrophilic and is readily wetted by the liquid fuel.

12. The fuel cell assembly of claim 11 wherein said backing layer comprises a hydrophilic coating.

13. The fuel cell assembly of claim 9 wherein said backing layer comprises a cellulosic material.

14. The fuel cell assembly of claim 9 wherein said backing layer comprises a copolymer of tetrafluoroethylene and perfluorovinylether sulfonic acid.

15. The fuel cell assembly of claim 1 further comprising a duct connecting said aerosol generator to said anode.

16. The fuel cell assembly of claim 15 further comprising a particle size conditioner connected to said duct and situated between said aerosol generator and said anode, said particle size conditioner being capable of separating liquid fuel droplets from the suspending gas based upon differences in particle size or charge.

17. The fuel cell assembly of claim 16 wherein said particle size conditioner is selected from the group consisting of a packed bed, a diffuser or an electrostatic separator.

18. The fuel cell assembly of claim 1 wherein said aerosol generator is selected from the group consisting of orifices, single fluid nozzles, two fluid nozzles, rotary atomizers and ultrasonic atomizers.

19. The fuel cell assembly of claim 1, wherein said aerosol generator comprises a plurality of atomizers capable of uniformly distributing said liquid fuel over said anode as liquid fuel droplets suspended in said suspending gas.

20. The fuel cell assembly of claim 19 further comprising a flow field element having an inner surface, said surface comprising a plurality of intersecting flow channels.

21. The fuel cell assembly of claim 20 wherein each of said atomizers is positioned on said inner surface of said flow field element.

22. The fuel cell assembly of claim 20, wherein said inner surface comprises a hydrophobic surface.

23. The fuel cell assembly of claim 22, wherein said inner surface comprises a polymer of tetrafluoroethylene.

24. The fuel cell assembly of claim 1 further comprising an anode vent and a droplet recovery unit connected to said anode vent, wherein said droplet recovery unit is capable of separating said liquid fuel droplets from said suspending gas.

25. The fuel cell assembly of claim 24 wherein said droplet recovery unit is selected from the group consisting of a filter, a membrane, a packed bed, or an electrostatic precipitator.

26. The fuel cell assembly according to claim 1 wherein said anode comprises pores, said pores having a mean pore diameter.

27. The fuel cell assembly according to claim 26 wherein the mean diameter of said liquid fuel droplets is less than 0.1 times the mean pore diameter of said pores comprising said anode.

28. An aerosol feed direct oxidation fuel cell, comprising:

a housing defining a volume;

a polymer electrolyte membrane mounted within said housing and separating said volume into an anode chamber and a cathode chamber;

a cathode formed on a side surface of the membrane facing the cathode chamber;

an anode formed on the opposing side surface of the membrane facing the anode chamber; and an aerosol generator situated within said housing and facing said anode.

29. A method for generating energy by direct oxidation of an organic fuel in a fuel cell having an anode, a cathode and an electrolyte, comprising the steps of:

atomizing said liquid fuel to form an aerosol comprising liquid organic fuel droplets suspended in a suspending gas;

exposing said anode to said aerosol while said anode is in electrical contact with said electrolyte;

exposing said cathode to said electrolyte while said electrolyte remains in electrical contact with said anode; and, exposing said cathode to an oxidizing gas while said cathode remains in electrical contact with said electrolyte.

30. The method of claim 29, wherein said aerosol is formed discontinuously by pulse atomization of said liquid fuel.

* * * * *